United States Patent
Shah et al.

[19]
[11] Patent Number: 6,003,755
[45] Date of Patent: Dec. 21, 1999

[54] METHOD FOR REPAIR WELDING ALUMINUM-LITHIUM ALLOYS

[75] Inventors: Sandeep Rajnikant Shah; Lynda Louise Johnston, both of Madison; Julian Ervin Bynum, Harvest; Samuel Dwight Clark, Woodville; Benny Floyd Graham, Guntersville; Ronald Brian Renfroe, Huntsville; Patrick Ryan Rogers, Madison, all of Ala.

[73] Assignee: Lockheed Martin Corp., New Orleans, La.

[21] Appl. No.: 08/803,481

[22] Filed: Feb. 20, 1997

[51] Int. Cl.⁶ .................................... B21D 31/02
[52] U.S. Cl. ............... 228/119; 228/262.5; 228/199; 228/155; 228/165; 228/174; 228/103; 228/104
[58] Field of Search ............... 228/119, 262.5, 228/199, 155, 165, 174, 103, 104; 148/695, 688; 29/402.09, 402.18, 90.7

[56] References Cited

U.S. PATENT DOCUMENTS

| | | | |
|---|---|---|---|
| 2,537,533 | 1/1951 | Ingalls | 29/148 |
| 3,487,530 | 1/1970 | Ely | 29/402 |
| 3,632,949 | 1/1972 | Thorne | 219/64 |
| 3,909,579 | 9/1975 | Williams et al. | 219/83 |
| 4,139,240 | 2/1979 | Profio et al. | 305/39 |
| 4,286,744 | 9/1981 | Gullotti et al. | 228/125 |
| 4,609,577 | 9/1986 | Long | 428/683 |
| 4,866,828 | 9/1989 | Fraser | 29/156.8 |
| 4,982,066 | 1/1991 | Waring | 219/137 PS |
| 5,067,234 | 11/1991 | Fraser | 29/889.1 |
| 5,092,942 | 3/1992 | Fraser et al. | 148/12 R |
| 5,111,570 | 5/1992 | Baumgarten et al. | 29/402.13 |
| 5,483,039 | 1/1996 | Gallagher | 219/125.11 |

*Primary Examiner*—Patrick Ryan
*Assistant Examiner*—M. Alexandra Elve
*Attorney, Agent, or Firm*—W. H. Meise; T. G. Fierke

[57] ABSTRACT

Aluminum-lithium alloy sheets which are welded together are examined to identify regions requiring repair. A grid is applied to the sheet about the region requiring repair, and the region to be repaired is ground out and rewelded. Residual stresses are relieved by planishing yes to cause localized plastic deformation in the repaired region. The grid is used as a guide to restoring the original dimensions of the sheet in a manner which tends to reduce in-plane shrinkage. The reduced in-plane shrinkage in turn tends to reduce undesired tensile residual stresses. The planishing also tends to work-harden the weld filler.

8 Claims, 5 Drawing Sheets

| PUNCH MARK ID | -1 | 0 | 1 | 2 | 3 | 4 | 5 | 6 | 7 |
|---|---|---|---|---|---|---|---|---|---|
| INITIAL WELD | 2.016 | 2.016 | 2.016 | 2.016 | 2.016 | 2.016 | 2.016 | 2.016 | 2.016 |
| AFTER REPAIR | 2.014 | 2.010 | 2.001 | 1.994 | 1.992 | 1.993 | 1.998 | 2.006 | 2.012 |
| SHRINKAGE | 0.002 | 0.006 | 0.015 | 0.022 | 0.024 | 0.023 | 0.018 | 0.010 | 0.004 |
| TARGET | 2.016 | 2.015 | 2.015 | 2.014 | 2.014 | 2.014 | 2.014 | 2.015 | 2.016 |
| PLANISHING PASSES | | | | | | | | | |
| 1(1") 3.5-2.5 | 2.014 | 2.010 | 2.004 | 2.002 | 2.000 | 1.998 | 1.999 | 2.008 | 2.012 |
| 2(3") 4.5-1.5 | 2.014 | 2.012 | 2.009 | 2.008 | 2.007 | 2.004 | 2.004 | 2.007 | 2.012 |
| 3(5") 0.5-5.5 | 2.014 | 2.014 | 2.014 | 2.014 | 2.013 | 2.012 | 2.011 | 2.012 | 2.013 |
| 4 | | | | | | | | | |
| 5 | | | | | | | | | |
| 6 | | | | | | | | | |
| 7 | | | | | | | | | |
| 8 | | | | | | | | | |
| 9 | | | | | | | | | |
| 10 | | | | | | | | | |
| FINAL RECOVERY (%) | 0.000 | 66.667 | 86.667 | 90.909 | 87.500 | 82.609 | 72.222 | 60.000 | 25.000 |

FACE MEASUREMENT

*Fig.3a*

METHOD FOR REPAIR WELDING ALUMINUM-LITHIUM ALLOYS

This invention was made in the performance of work under NASA contract NAS8-36200A, and is subject to the provisions of Section 305 of the National Aeronautics and Space Act of 1958 (42 U.S.C. 2457). Waiver number MFS-31136 has been granted.

FIELD OF THE INVENTION

This invention relates to welding metals, and more particularly to the repair of welds made in aluminum-lithium alloy.

BACKGROUND OF THE INVENTION

The external propellant tank of the space shuttle, designated 10 in FIG. 1a, has been successfully made from aluminum. The external propellant tank 10 includes a hydrogen propellant tank 11, which is made from two end pieces 14 and 15, each of which is in the general form of a hemisphere, separated by two or more cylindrical tank sections, one of which is designated 16, and all of which are welded together. The complete tank 10 includes an intertank 12 and oxygen tank 13. An automated arrangement for welding sections of the tank is described in U.S. Pat. No. 5,483,039, issued Jan. 9, 1996 in the name of Gallagher. The standard aluminum alloy external tank is, however, a significant contributor to the weight of the space shuttle at launch. In order to improve the payload of the space shuttle, attention has been directed toward fabricating the external tank from lighter-weight materials than standard aluminum alloys. Among the materials which are u under investigation is aluminum-lithium 2195 alloy, which is light and strong. Unfortunately, aluminum-lithium alloys are more difficult to fabricate than ordinary aluminum alloys, in that welding tends to change the structure of the material in the region of the weld, as mentioned in U.S. patent application Ser. No. 08/584,901, filed Jan. 11, 1996 in the name of McGee et al.

Improved welding and repair methods are desired.

SUMMARY OF THE INVENTION

A method according to the invention is for repair welding pieces of metal which exhibit residual stresses after the repair welding process, where the stresses significantly weaken the piece or pieces. The method includes the step of identifying a region requiring weld repair, and making grid markings on the piece to be repaired in order to form a marked region, which includes the region requiring weld repair. The region requiring weld repair is welded, to form a welded region lying within the marked region. The welded region is distorted and weakened by residual stresses arising from the weld repair operation. At least a portion of the welded region is planished in such a manner as to tend to restore the grid to its original dimensions. As a result of the restoration of dimensions of the welded region, residual stresses are reduced, and the strength of the welded region is greater than it would have been without planishing and also greater than with undirected planishing. The planishing may be performed by a pneumatic planishing gun together with a backup bar. In a particular embodiment of the invention, the grid is formed by punch marks in the metal at the "corners" of a grid. The metal may be aluminum-lithium alloy. A particularly advantageous aluminum-lithium alloy is 2195 alloy.

BRIEF DESCRIPTION OF THE DRAWINGS

FIG. 3a is a tabulation of initial grid measurements in a region to be repaired, measurements after the repair weld, and after various steps in a method according to the invention, and FIG. 3b is a plot of some of the numbers tabulated in FIG. 3a.

DESCRIPTION OF THE INVENTION

Figure 1A:
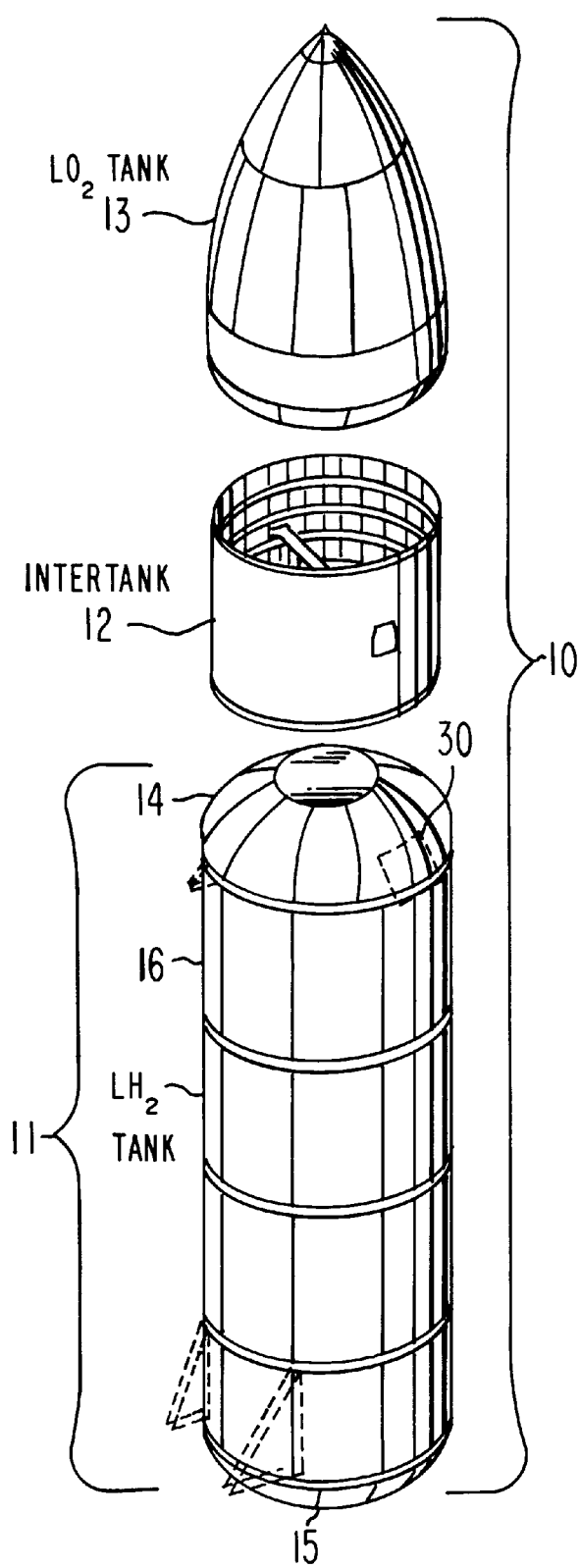
FIG. 1a is a simplified, partially exploded view or representation of an external fuel or propellant tank for the space shuttle which is assembled by welding.
Figure 1B:
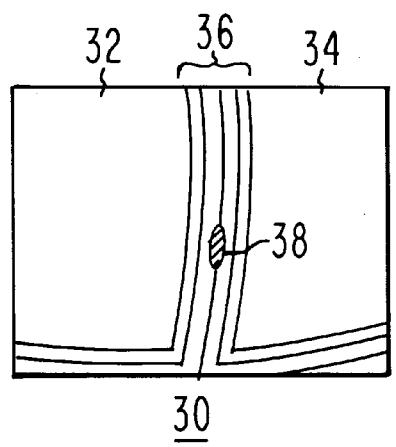
FIG. 1b is an enlarged view of a portion 30 of the tank of FIG. 1a, showing a region requiring repair.

FIG. 1b illustrates a detail 30 of the tank 10 of FIG. 1a. In FIG. 1b, a welded seam between 2195 aluminum-lithium alloy plates 32 and 34 is illustrated as 36. A defective weld region is illustrated as 38. It has been found that simply removing the defective weld region, as by grinding, and rewelding the region, results in shrinkage. The shrinkage is accompanied by internal stresses in the repair region. When the welded sheet with the repair weld is subjected to external loads, as it would be during a shuttle flight, the combination of the internal stresses attributable to the repair weld, together with the structural loads, may result in failure.

It has been discovered that planishing the repair weld to eliminate the shrinkage also tends to redistribute and reduce the maximum values of the internal stresses, which in turn substantially increases the strength of the structure to external loads. Planishing is a hammer-peening type of operation which produces localized plastic deformation in the peened area, which tends to expand the shrunken metal. The planishing also work-hardens at least the filler weld material in the repair region. According to the invention, a measuring grid is affixed to the metal plates before the repair weld is performed, the repair weld is made, and the repaired surface is planished to tend to restore its original dimensions. Ideally, the grid is marked on both sides of the sheet being repaired.

Figure 2B:
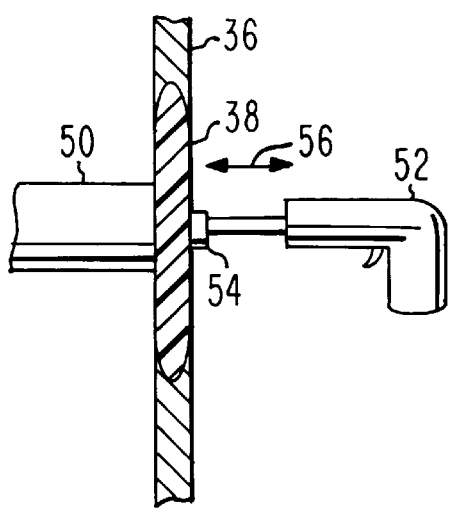
FIG. 2b is a cross-sectional view of the repair region of FIG. 2a, showing how planishing may be performed in the repaired region.
Figure 2A:
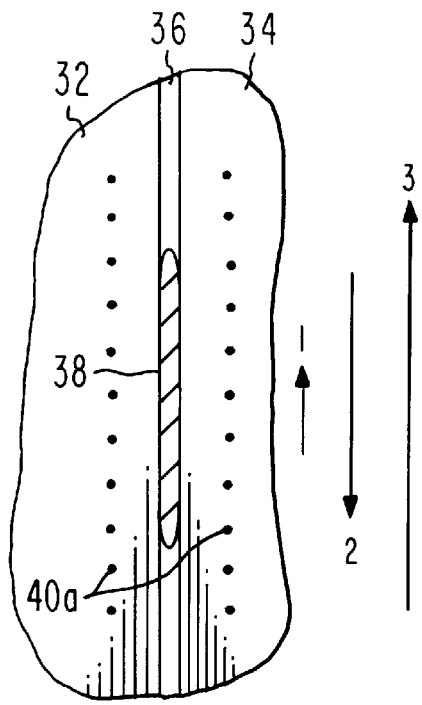
FIG. 2a is a simplified of the region to be repaired of FIG. 1b, showing grid marks.

FIG. 2a is a simplified illustration of a portion of the welded seam 36 between plates 32 and 34 of FIG. 1b. In FIG. 2a, a set of grid marks 40 is illustrated in the form of pairs of punch marks, one pair of which is illustrated as 40a. The punch marks of pair 40a are placed equidistant on either side of the region to be welded. In a particular embodiment of the invention, each pair of punch marks 40a has a two-inch spacing, so that each punch mark of a pair is spaced by one inch from the nominal centerline of the seam to be repair welded. The pairs of punch marks are spaced from the next adjacent pair(s) by a convenient distance, such as 0.5 inch, along the length of the region 38 to be repaired, and preferably somewhat beyond the region to be repaired. The grid marks are placed on the metal before the repair weld is made, and provide a basis to determine the amount of shrinkage of the welded region in a direction transverse to the length of the region to be weld repaired. Little shrinkage is expected in a direction parallel to the length of the weld, so the illustrated grid is selected to provide dimensional information principally in a direction perpendicular to its length.

According to an aspect of the invention, the grid marks are preferably placed on both sides of the sheet which is to be repair welded, to make the following steps more convenient. The grid marks on the mutually opposite sides of the sheet under repair can be approximately registered with each other by careful measurement from features which are apparent on both sides of the structure. Exact registration is not necessary.

Figure 2C:
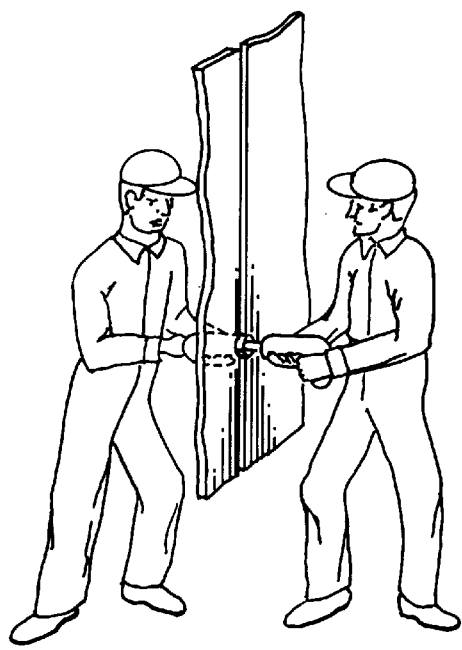
FIG. 2c shows how two people can manipulate the tools as shown in FIG. 2b.

FIG. 2b is a simplified illustration of an arrangement for performing the planishing in accordance with the invention. In FIG. 2b, the repair region 38 of FIG. 2a is seen in cross-section. A massive backing bar is illustrated as 50, and a planishing gun, which may be a pneumatically or electrically driven rivet gun, is illustrated as 52. Planishing gun 52 includes a head 54 which reciprocates in the direction of double-headed arrow 56, to strike repeated blows against the surface, to thereby cause localized plastic deformation of the weld region. The backing bar 50 and the planishing gun 52 may be hand-held, as suggested by FIG. 2c. In any case, the backing bar and the planishing gun are moved along the repaired region together, in an up-down direction as seen in FIG. 2b.

It has been discovered that undirected planishing can produce a worse result than simply performing the repair weld, without any planishing whatever. According to another aspect of the invention, the pattern taken by the planishing gun (and the backing bar) is "inside-out," in that the planishing gun is moved or directed in such a fashion that the planishing blows are made in successive passes, with the first pass beginning near the center of the repair weld, and progressively moved outward. A typical pattern is illustrated by arrows designated 1, 2, and 3 in FIG. 2a. The relatively short arrow 1 of FIG. 2a represents a line of blows or a pass along the centerline of the repair weld, covering a short region near the center of the repair weld, and moving upward as seen in FIG. 2a. Somewhat longer arrow 2 represents a second pass, or second line of planishing blows, which begins above the region associated with arrow 1, and which moves downward through the region already planished by the line of blows represented by arrow 1, to terminate at a point below that reached by the blows of arrow 1. Similarly, longest arrow 3 represents a third pass or third line of planishing blows which begins below the region associated with arrow 2, and which moves upward through the region already planished by the line of blows represented by arrow 2, to terminate at a location above that reached by the blows of arrow 2. This pattern continues, so long as additional planishing is required. The purpose of planishing in this "inside-out" pattern is to tend to stretch the metal approximately the amount by which it is measured to have shrunk. Since the shrinkage is at a maximum near the center of the repaired region, the total amount of planishing near the center region is maximized in a controlled fashion by adopting the described pattern of multiple passes. For maximum strength enhancement, the last planishing pass should extend beyond the ends of the repair, and in a direction parallel to the length of the repair weld.

The last planishing pass should extend about one inch beyond the ends of the repair weld. This assures that any tensile residual stresses induced by the planishing operation occur outside of the repair area, which is presumably weaker than the original welded area.

According to a further aspect of the invention, the repaired region (or more properly, the grid in the repaired region) is measured after each planishing pass, to see how the restoration or recovery of the dimensions is progressing. The measurements may be couched in terms of absolute dimensions or in terms of percentages, as desired.

Figure 3B:
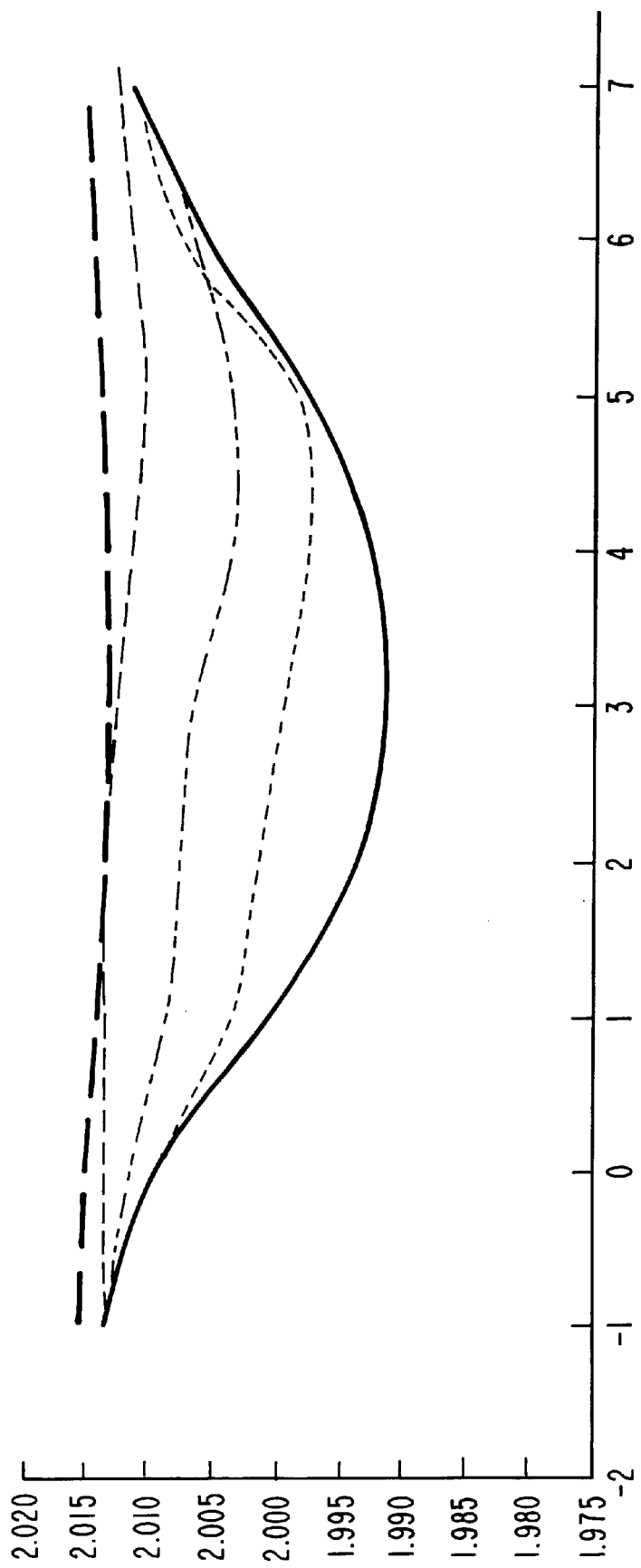

In order to assess the progress of the restoration of dimensions of a repaired region, the dimensions of the grid may be tabulated on a spreadsheet, as illustrated in FIG. 3a, which is associated with a repair region which is illustrated in conceptual form in FIG. 3b. In FIG. 3a, the punch marks corresponding to 40 of FIG. 2a are given arbitrary individual designations, which in this case are ordinal numbers ranging from −1 to 7, but which could be letters of the alphabet, or other designations. FIG. 3a includes tabulated dimensions for the face side of the repair weld region. Dimensions for the opposite side of the repair region are tabulated in the same manner, using a corresponding set of punch marks, as described above. In the row of FIG. 3a labeled "Initial Weld", the transverse spacing between each pair of the punch marks is indicated as being 2.016 inches. The corresponding measurements after the repair weld are in the row labeled "After Repair." As can be seen, the maximum shrinkage is to a dimension of 1.992 inches, in the vicinity of punch mark pair 3. The shrinkage near punch mark pairs 0 and 6, which are relatively distant from the center of the repair weld, reduces the dimensions to 2.015 and 2.015 inches, respectively. The row of the table of FIG. 3a designated "Shrinkage" indicates the difference between the first two rows, and corresponds to the amount of shrinkage occasioned by the repair weld. Thus, the shrinkage near punch mark pair 3 is the difference between 2.016 inches and 1.992 inches, which is a shrinkage of 0.024 inches. Similarly, the shrinkage near punch mark pairs −1 and 7 is a relatively low 0.002 and 0.004 inches, respectively. The target values of shrinkage, which means the value of net shrinkage after the repair weld and the planishing operation, are indicated in the fifth row of the table. In general, strength is increased with increasing levels of shrinkage recovery. Extremely high levels of recovery, which is recovery beyond the amount of original shrinkage, are not desirable. Excessive planishing can result in exhaustion of the ductility in the repair area or induce detrimental residual stresses or distortion. In the particular application illustrated in FIG. 3a, an adequate strength level was achieved with less than full shrinkage recovery.

The lowermost solid line of FIG. 3b represents the transverse dimensions between punch mark pairs after the repair weld is made. As illustrated, the lowermost solid line is bowed downward. The upper left and right edges of the solid line represent the original dimension, and the deepest point of the downward bow represents the maximum shrinkage. The point of maximum shrinkage, near punch mark pair 3, is evident, and is near the center of the repaired region.

The uppermost dash line of FIG. 3b represents the target value of shrinkage after planishing, taken from the table of FIG. 3a. The three intermediate dash and dot-dash lines in FIG. 3b, lying between the lowermost solid line and the uppermost dash line, represent a plot of the dimensions between punch mark pairs after each successive planishing pass. The data values forming the basis for the three intermediate lines in FIG. 3b are presented in the lower portion of the table of FIG. 3a, in the rows labeled "planishing passes". The grid dimensions after each of three planishing passes designated 1, 2, and 3 are recorded in three rows. The starting and ending points of the three passes are also indicated: the first pass extends from a position corresponding to "punch mark" 3.5 (a location between punch mark pairs 3 and 4) to location 2.5, for a total planishing pass length of one inch; the second pass extends between locations corresponding to punch mark 4.5 to 1.5, a planishing pass length of three inches; and the third pass extends from location 0.5 to location 5.5, a planishing pass length of five inches. Furthermore, the direction of the planishing pass is also indicated by this data; the first planishing pass is from right to left in FIG. 3b, the second pass is from right to left, and the third pass is from left to right. In this particular instance, the planishing passes deviate from the preferred "up-down-up . . . " pattern, because, as illustrated in FIG. 3b, the first planishing pass resulted in asymmetrical recovery, in that the recovery near punch mark pair 2 was greater than the recovery near punch mark pair 4.5 The table of FIG. 3a also indicates the amount of final recovery of shrinkage, which is actually the amount of expansion occasioned by the three planishing passes, expressed as a percentage.

Figure 4:
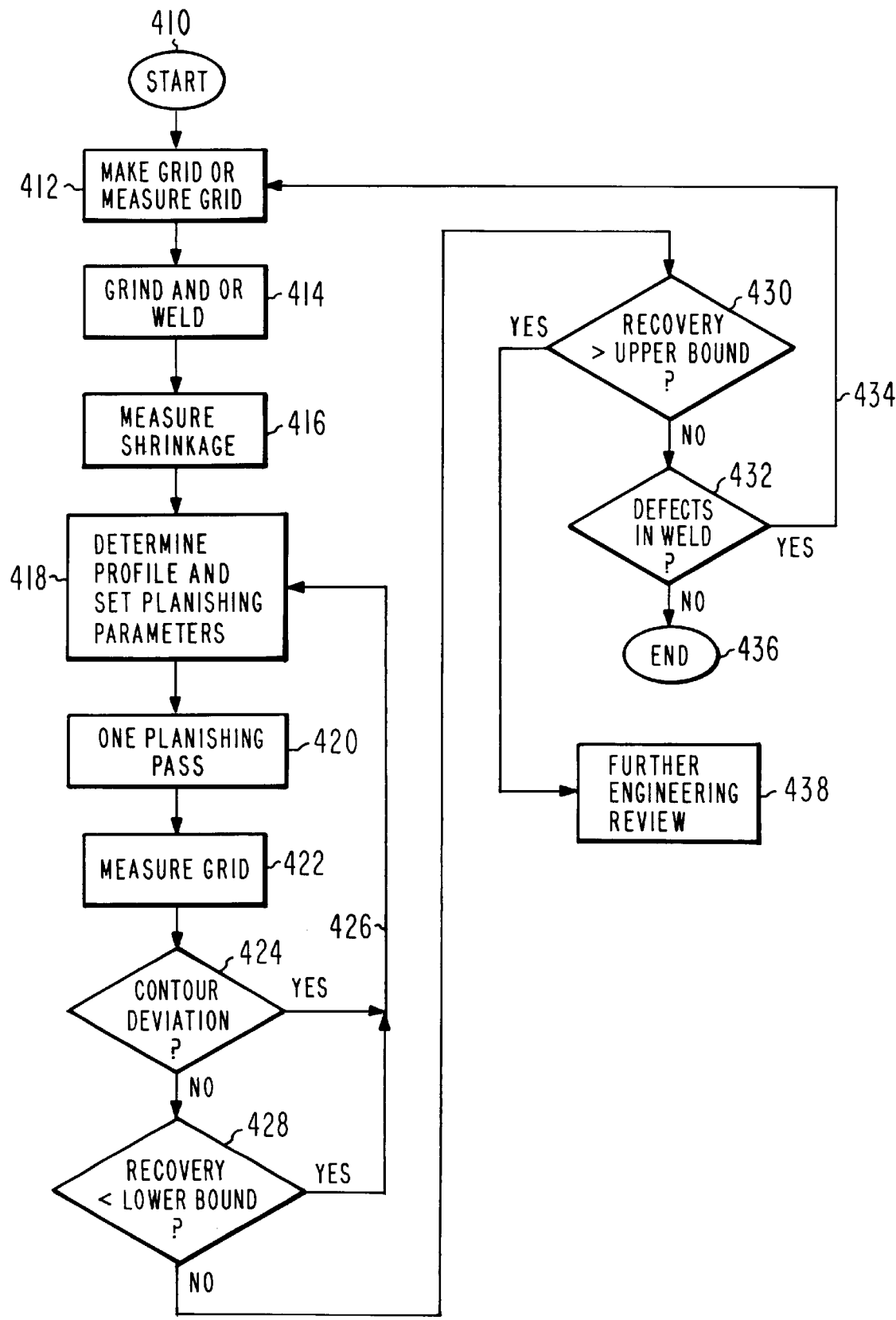
FIG. 4 is a flow chart illustrating a procedure according to an aspect of the invention.

FIG. 4 is a simplified flow chart setting out the repair procedure. It is assumed that the region to be repaired has already been identified. The procedure starts at a block 410, and proceeds to a further block 412, representing measuring of an existing grid, or setting up a grid in the region to be repaired if one does not already exist. Block 414 represents the grinding out of the region to be repaired, and the welding of the repair region. From block 414, the logic of the chart flows to a block 416, which represents the measuring of the grid to determine shrinkage, much as set out in the table of FIG. 3a. Block 418 represents the determination of the shrinkage profile, and the setting of planishing parameters. The direction of each succeeding planishing pass is dictated by the recovery profile of the previous planishing pass. Shrinkage recovery may be greater or less at the beginning or end of the planishing pass, depending upon factors such as operator technique or hardware configuration. Similarly, shrinkage recovery may be more or less on the obverse (face) side or on the reverse side of the repaired region. Achieving substantially uniform shrinkage on both sides is desirable, and may require exchanging the sides to which the planishing gun and backing bar are applied on alternate passes. Once the planishing parameters are established, a single planishing pass is made pursuant to those parameters, as represented by block 420. Following the first planishing pass, the grid is again measured (block 422), and the logic of the chart of FIG. 4 flows to a decision block 424. In addition to the in-plane distortion occasioned by weld repair, and described above, repair welding may also cause out-of-plane distortion in certain situations. In repair welding of a curved tank end such as end 14 of FIG. 1a, the hemispherical configuration itself may be distorted, and such out-of-plane distortion is referred to, in this case, as contour deviation. If such a contour deviation remains, which means that all of the distortion is not eliminated, the logic leaves decision block 424 by the YES output, and flows over a logic path 426 back to block 418. The logic continues to loop around blocks 418, 420, 422, 424, and path 426, until such time as the last planishing pass indicates no contour deviation outside of the set limits. The logic then exits decision block 424 by the NO output, and flows to a further decision block 428. Decision block 428 determines if the shrinkage recovery is within the set lower bound. If the recovery has not come within the lower bound, the logic loops back to block 418 for a further planishing pass.

Eventually, the multiple planishing passes caused by the loop of FIG. 4 as so far described will bring the contour deviation to acceptable limits, and the recovery within the lower bound, in which case the logic will leave logic block 428 by NO output, and flow to a further decision block 430. Decision block 430 represents an examination of the data to determine if the planishing passes have caused the recovery to exceed the allowable upper bound. Exceeding a certain amount of shrinkage recovery may be disadvantageous, as mentioned above. If the recovery exceeds the upper bound, the logic leaves decision block 430, and goes to block 438, representing a further engineering analysis, to determine why the procedure did not produce the expected result. On the other hand, if the recovery does not exceed the upper bound, the logic flows from the NO output of decision block 430 to a further decision block 432. Decision block 432 represents an examination of the weld to verify that it has no defects. This examination may be made in many ways, such as by visual inspection, by the use of penetrating dyes, by penetrating radiation, or the like. If the weld is not defective, the logic of FIG. 4 leaves decision block 432 by the NO output, and reaches an END block 436, representing completion of the procedure. If the repaired region is still defective, the logic leaves decision block 432 by the YES output, and flows over a path 434 to block 412, to start the entire repair procedure over again.

Thus, a method is described for repair welding pieces of metal which exhibit residual stresses after welding, which result in significant weakening of the pieces. The method includes the step of identifying a region requiring repair welding, and making grid markings on the joined pieces which are to be weld repaired to form a marked region, which includes the region requiring weld repair. The region is welded, to form a weld paired region lying within the marked region. The repaired region is distorted and weakened by residual stresses in the welded region. The distortion affects the grid markings placed on the pieces. At least a portion of the repair welded region is planished in such a manner as to tend to restore the grid to its original dimensions. As a result of the restoration of dimensions of the welded region, residual stresses are reduced, and the strength of the repaired region is greater than it would have been without planishing and also greater than with undirected planishing. In a particular embodiment of the invention, the grid is formed by punch marks at the intersections of imaginary grid lines, corresponding to the corners of the grid. The metal may be aluminum-lithium alloy.

Other embodiments of the invention will be apparent to those skilled in the art. For example, alternate methods for inducing plastic deformation in the repair region may be used, such as roll planishing or hydraulic pressing. The grid may be formed by punch marks as described, by scribe lines, or by any other convenient measurement method which places monuments or indica on the surface which move in consonance with the plastic deformation.

What is claimed is:

1. A method for repairing pieces of metal which exhibit residual stresses after repair welding which significantly weaken the pieces, said method comprising the steps of:
    identifying a region requiring repair:
        making grid markings in a marked region including said region requiring repair:
            welding said region requiring repair, to thereby form a repaired region lying within said marked region, said repaired region being distorted and being weakened by residual stresses;
        planishing at least a portion of said region requiring repair in such a manner as to tend to restore said grid to its original dimensions, whereby said residual stresses are reduced, and the strength of said repaired region is greater than without planishing and also greater than with undirected planishing.

2. A method according to claim 2, wherein said step of planishing includes the step of hammer-peening said region requiring repair.

3. A method according to claim 1, wherein said piece of metal is in the form of a sheet of metal defining an obverse side and a reverse side, and wherein:

said step of making grid markings is performed on said obverse and/or reverse side of said sheet; and said step of planishing is performed by applying a hammer to said obverse side of said sheet, and a backing mass to said reverse side of said sheet; or vice versa.

4. A method for repairing pieces of metal which exhibit residual stresses after welding which significantly weaken the pieces, said method comprising the steps of:

identifying a region requiring repair:

making grid markings in a marked region including said region requiring repair:

welding said region requiring repair, to thereby form a repaired region lying within said marked region, said repaired region being distorted and being weakened by residual stresses;

planishing at least a portion of said region requiring repair in such a manner as to tend to restore said grid to its original dimensions, whereby said residual stresses are reduced, and the strength of said repaired region is greater than without planishing and also greater than with undirected planishing; and further comprising, between said step of identifying a region requiring repair and said step of welding, of grinding a defective region from said piece, to thereby form a region to be filled by said welding step.

5. A method for repairing aluminum-lithium alloy, which exhibits residual stresses after welding which significantly weakens the repair, said method comprising the steps of:

identifying a region of said aluminum-lithium alloy requiring repair:

making grid markings in a marked region including said region requiring repair:

welding said region requiring repair, to thereby form a repaired region lying within said marked region, said repaired region being distorted and being weakened by residual stresses;

planishing at least a portion of said region requiring repair in such a manner as to tend to restore said grid to its original dimensions, whereby said residual stresses are reduced, and the strength of said repaired region is greater than without planishing and also greater than with undirected planishing.

6. A method according to claim 5, wherein said step of planishing includes the step of hammer-peening said region requiring repair.

7. A method according to claim 5, wherein said piece of metal is in the form of a sheet of metal defining an obverse side and a reverse side, and wherein:

said step of making grid markings is performed on said obverse and/or reverse side of said sheet;

said step of planishing is performed by applying a hammer to said obverse side of said sheet, and a backing mass to said reverse side of said sheet; or vice versa.

8. A method according to claim 5, further comprising, between said step of identifying a region requiring repair and said step of welding, of grinding a defective region from said piece, to thereby form a region to be filled by said welding step.

* * * * *